No. 678,123. Patented July 9, 1901.
W. P. McCOBB.
ATTACHMENT FOR STOVES.
(Application filed May 26, 1900.)
(No Model.)

WITNESSES.
C. H. Gannett
J. Murphy.

INVENTOR.
William P. McCobb
by Jas. H. Churchill
atty.

THE NORRIS PETERS CO., PHOTO-LITHO., WASHINGTON, D. C.

UNITED STATES PATENT OFFICE.

WILLIAM P. McCOBB, OF BOSTON, MASSACHUSETTS, ASSIGNOR TO FRANK W. McCOBB, OF SAME PLACE.

ATTACHMENT FOR STOVES.

SPECIFICATION forming part of Letters Patent No. 678,123, dated July 9, 1901.

Application filed May 26, 1900. Serial No. 18,094. (No model.)

*To all whom it may concern:*

Be it known that I, WILLIAM P. MCCOBB, a citizen of the United States, residing in Boston, in the county of Suffolk and State of Massachusetts, have invented an Improvement in Attachments for Stoves, of which the following description, in connection with the accompanying drawings, is a specification, like letters on the drawings representing like parts.

This invention relates to an apparatus employed on cooking stoves or ranges, with which the smoke, odors, &c., arising from a receptacle in which food is being cooked may be carried off to the chimney by the draft of the stove, thus avoiding soiling the walls and ceiling of the kitchen and also avoiding the odor of the food being cooked permeating the house. For this purpose I employ a hood attached to a horizontal pipe having a vertical leg guided by a pipe-section attached to a cover of the stove, the said cover having an opening for the passage into the stove of the smoke odors, &c., and when of substantially small size the said cover is provided with a counterbalance for the hood. The vertical leg of the horizontal pipe is made of sufficient length to support the hood, when in its lowermost position, a sufficient distance above the stove to leave an air-space between the said hood and a shallow receptacle, such as a frying-pan, so as to permit access of air to the food being fried in order to brown the same. The hood is adjustable vertically to enable it to be used with deeper receptacles, such as kettles, upon which it may rest, and the said hood is preferably provided with a bead or flange which acts as a gutter to arrest the downward course or flow of condensed steam and prevent the latter dripping off onto the stove, thus avoiding soiling or spotting the stove with greasy deposits.

These and other features of this invention will be pointed out in the claims at the end of this specification.

Figure 1:
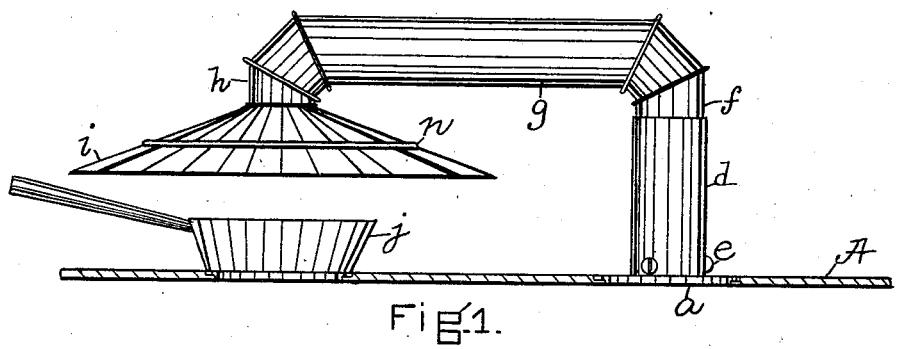
Figure 2:
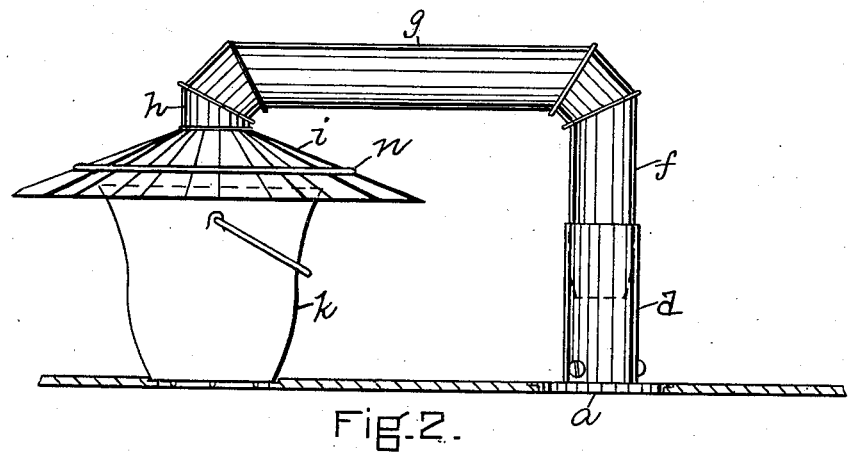
Figure 3:
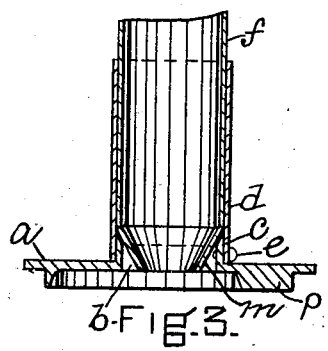

Figure 1 represents in section and elevation a sufficient portion of a stove provided with an apparatus embodying this invention to enable it to be understood; Fig. 2, a similar view with the hood of the apparatus in its elevated position; Fig. 3, a sectional detail to be referred to, and Fig. 4 a modification to be referred to.

Figure 4:
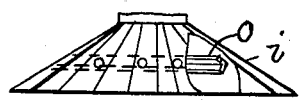

Referring to Fig. 1, A represents the top of a cooking stove or range, which may be of any suitable or usual construction and which has fitted to one of its cover-holes a cover $a$. (See Fig. 3.) The cover $a$ is provided with an opening $b$ through it and with an upwardly-extended lip or flange $c$ around said opening and over which is fitted the lower end of a pipe-section $d$, which may be firmly secured to the flange $c$ by screws or rivets $e$ or in any other suitable manner. The pipe $d$ has extended into it the vertical leg $f$ of a horizontal pipe $g$, having at its opposite end a short vertical leg $h$, to which is attached a conical hood $i$. The horizontal pipe $g$ is made of a length substantially equal to the distance between adjacent cover-holes in the stove, so that when the cover $a$ is fitted to one hole the hood $i$ will be located over an adjacent cover-hole and above a cooking-receptacle placed over or fitted into said adjacent cover-hole. The cooking-receptacle is shown in Fig. 1 as a frying-pan $j$ and in Fig. 2 as a kettle $k$. The vertical leg $f$ of the pipe $g$ is preferably provided with a contracted or conical end $m$, which projects into and rests upon the annular lip or flange $c$ on the cover, and thereby conducts moisture or water of condensation into the stove and prevents the same leaking between the flange $c$ and the pipe-section $d$ and onto the stove, which would give rise to objectionable odors, besides soiling the stove. The leg $f$ is made of sufficient length so that when it rests upon the said flange, as shown on Fig. 3, the hood will be elevated above the shallow cooking-receptacle or frying-pan $j$ a sufficient distance to leave an air-space between the said hood and frying-pan, so as to permit access of air to the food being fried to brown the same. The hood may be elevated when it is desired to use the same with deeper cooking-receptacles, like the kettle $k$, (shown in Fig. 2,) and in this case the hood may rest on the edge of the kettle and form a cover therefor, the vertical leg $f$ being guided by the pipe-section $d$. It will be seen from an inspection of the drawings that the smoke, steam, odors, &c., arising from the food being cooked are directed by the hood $i$ into the pipe $g$, through which they are drawn by the draft of the stove down the vertical leg $f$ into the stove, thus avoiding the disagreeable features attending cooking food on a stove as now commonly practiced. The hood may be provided with a gutter on its under side, which may be formed by a bead $n$, as shown in Figs. 1 and 2, or by an angle-piece $o$, as shown in Fig. 4. The gutter thus formed serves to catch the water of condensation which may run down the under side of the hood and cause the same to drip into the receptacle beneath the hood, thus avoiding spattering of the top of the stove.

Stoves or ranges are provided with different sizes of covers, according to the size of the stove, and when the hood is to be used on stoves having covers of smaller size—for instance, covers seven inches in diameter—the said covers are provided on their under side, at one side of the opening therein, with an additional amount of metal $p$, which acts as a counterbalance for the hood, whereas in the case of the eight-inch covers the latter are sufficiently heavy to counterbalance the hood.

I claim—

1. The combination with a stove-cover having an opening in it and provided with an upwardly-extended flange or lip, of a pipe-section secured to said flange or lip, and a substantially horizontal pipe provided at one end with a depending leg inserted into said pipe-section and having its end contracted to permit it to be inserted into the flange on the cover, and at its opposite end with a hood provided above its edge with a gutter, substantially as and for the purpose specified.

2. The combination with a stove-cover having an opening in it and provided with an upwardly-extended flange or lip, of a pipe-section secured to said flange or lip, and a substantially horizontal pipe provided at one end with a depending leg inserted into said pipe-section, and at its opposite end with a hood, and a counterbalance for the hood attached to the said cover at one side of the opening therein, substantially as described.

In testimony whereof I have signed my name to this specification in the presence of two subscribing witnesses.

WILLIAM P. McCOBB.

Witnesses:
JAS. H. CHURCHILL,
J. MURPHY.